Patented Aug. 10, 1954

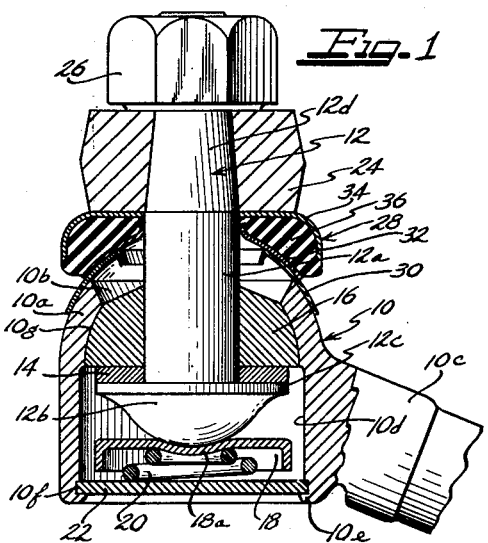
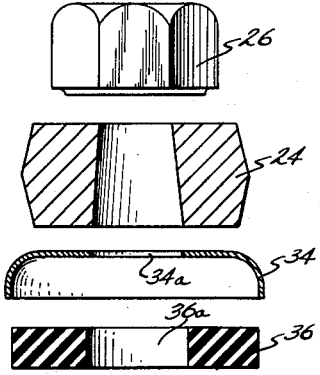
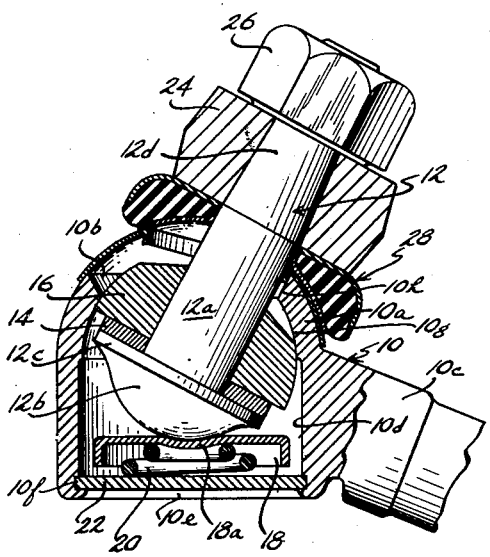
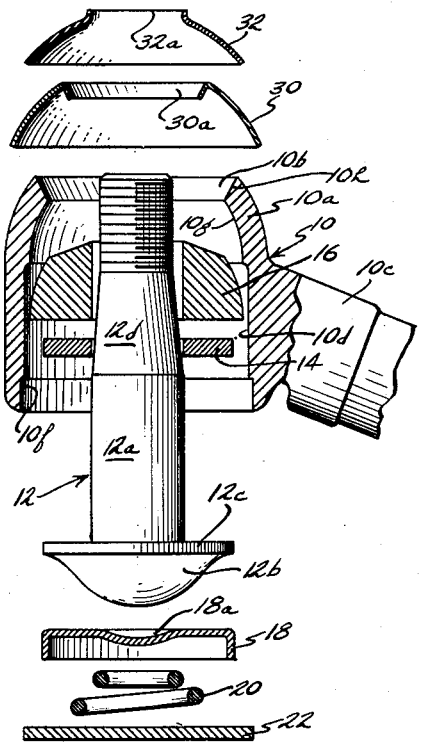

2,686,070

UNITED STATES PATENT OFFICE 2,686,070

JOINT SEAL

James H. Booth, Venice Township, Shiawassee County, Mich., assignor to Thompson Products, Inc., Cleveland, Ohio, a corporation of Ohio Application August 4, 1949, Serial No. 108,551

5 Claims. (Cl. 287—90)

This invention relates to a seal construction for oscillatory joints, such as universal joints. Specifically, the invention relates to a seal structure for tie rod joints. The seal construction embraces a stud element of the tie rod joint and has a part seated on the joint housing coacting with the stud embracing part so as to effectively seal the joint housing from the entry of dust and water even during tilting and turning movement of the stud member.

In accordance with this invention, the socket or housing member receives, in snug slidably fitting relation over one end thereof, a stamped metallic member which is contoured to substantially conform to the contour of the end of the housing. This end of the housing is open and has a stud member projecting therethrough, the stud member having one end disposed within the housing for bearing contact during tilting and rotating movement.

The aforementioned stamping member has an inturned lip defining a central aperture which, in normal position of the stamping in relation to the housing, is concentric to the opening at the end of the housing. The stud projects freely through the opening defined by the inturned lip on the stamping. A second stamping member snugly and slidably fits over the first stamping member and has a central upturned lip portion defining an aperture therethrough, the lip portion snugly embracing the shank of the aforementioned stud. A rubber-like deformable plastic or washer member fits on top of the second stamping and embraces the lip portion thereof and the stud shank. A third stamping member snugly embraces the stud shank and is cup-shaped with a flat bottom to receive the rubber-like washer. A linkage member is secured to the end of the stud, loading the cup-shaped stamping against the washer with considerable force thus deforming the washer so it will seal the stud shank and exert compressive forces against the lower stampings, thereby effectively sealing them.

When the stud is tilted to a position other than normal to the housing, the second mentioned stamping, the washer and the cupped stamping move simultaneously with the stud and the first mentioned stamping moves with the stud when the stud contacts a portion of its inturned lip. During such tilting movement, the second mentioned stamping slides over the first in a telescoping manner. The tilting movement of the stud and joint seal construction is arrested when the inturned lip of the first mentioned stud comes to rest against the shoulder defining the periphery of the open end of the housing.

The invention will hereinafter be specifically described as embodied in such a tie rod joint, wherein the joint housing is secured to a tie rod and a linkage member of an automotive vehicle steering control unit is attached to the stud, but it should be understood that the seal of this invention may be utilized in many installations and therefore the invention is not limited for usage with tie rod joints.

It is, then, an object of this invention to provide a dust cap and seal for tie rod joints which seals the joint socket from the entry of dust and liquid while allowing full tilting and rotating movement of the joint assemblage.

Another object of the invention is to provide a dust cover and seal construction for a universal joint which is so fitted to the joint as to prevent the escape of lubricant from within the joint housing while preventing the entry of dust and liquid into the joint housing.

A further object of the invention is to provide a universal joint seal construction which may be economically manufactured and assembled.

A specific object of the invention is to provide a tie rod joint seal wherein the opening to the joint housing is covered by a plurality of telescoping metallic members pressured through a rubber-like washer member.

Other and further objects of this invention will be apparent from the following detailed description of the annexed sheet of drawings which forms a part of this specification and discloses a preferred embodiment of the invention.

On the drawings:

Figure 1 is a vertical cross-sectional view, with parts in elevation, of a tie rod joint and joint seal constructed in accordance with this invention.

Figure 2 is a view similar to Fig. 1 with the parts in exploded relation to indicate the assembly of the joint and seal construction.

Figure 3 is a view similar to Fig. 1, but showing the stud element of the joint in extreme tilted position.

As shown on the drawings:

In Fig. 1 and the other figures, the reference numeral 10 designates generally a tie rod joint housing or socket and the reference numeral 12 designates generally a stud element tiltable and rotatable in the housing or socket 10.

The housing 10 is of substantially cylindrical configuration and has a rounded end portion 10a defining a stud end opening 10b. The housing 10 has a lateral stem or shank portion 10c which may be threaded or otherwise secured to the end of a tie rod (not shown). The housing has an internal bore 10d which communicates with the stud opening 10b and also communicates with another opening 10e at the opposite end of the housing 10. The end defining the opening 10e has a countersunk portion 10f (as best seen with reference to Fig. 2) for a purpose which will be more fully described hereinafter.

The aforementioned stud 12 has a shank portion 12a terminating in a rounded head 12b disposed within the central bore 10d. The head 12b is substantially semispherical and of a diameter substantially greater than the diameter of the stud shank 12a. The head 12b has a flattened upper portion or shoulder 12c adjacent the shank 12a which is embraced at this point by a washer member 14. The washer member 14 bears against a bearing element 16 which also embraces the shaft 12a of the stud 12 adjacent the above washer 14. The bearing element 16 is of segmental spherical configuration to bear against a segmental spherical bearing surface 10g on the inner side of the rounded portion 10a of the housing 10.

A seating element 18 having a centrally located dimple 18a is freely disposed within the cavity 10d for seating the stud head 12b on the dimple 18a. A coiled spring 20 is disposed between the underside of the seating element 18a and an end closure member 22 which is retained in the countersink 10f by spinning or peening the lower portion of the housing 10 inwardly to define the inturned flange 10e. The pressure of the coil spring 20 forces the seating member 18, the stud 12, the washer 14 and the bearing element 16 upwardly to contact the segmental spherical bearing surface 10g of the housing 10.

Bearing contact between the element 16 and bearing surface 10g occurs throughout all rotating and tilting (as demonstrated in Fig. 3) movements of the stud 12. The movements of the stud 12 are caused by forces applied to a linkage member 24 embracing the tapered portion 12d of the stud 12. The stud 12 is threaded at its external end adjacent the tapered portion 12d to receive a retaining nut 26 thereon which holds the linkage 24 in place.

A dust cover unit indicated generally by the reference numeral 28 closes the upper restricted opening 10b of the housing 10 and is disposed about the stud shank 12a between the linkage 24 and the housing 10.

The dust cover and seal unit 28 comprises a lower metallic cover member 30 and an intermediate cover member 32 and an upper cover member 34, and a gasket 36 interposed between the intermediate and upper cover members. The lower cover member 30 is an annular sheet metal stamping of segmental spherical configuration having an inturned flange portions 30a defining the central aperture. The stamping loosely embraces the stud shank 12a and its inner surface rests atop the rounded portion 10a of the housing for sliding contact therewith. The intermediate stamping 32 is annular having an outturned flange 32a defining a central aperture and snugly embracing the stud shank 12a. The stamping 32 is of segmental spherical configuration resting atop the lower stamping 30 for sliding or telescoping contact therewith. The metallic stamping 34 is annular, defining a central opening 34a for embracing the stud shank 12a. The top of the member 34 is flattened, the outer periphery being rounded for retaining the rubber-like gasket member 36. The gasket 36 has a central aperture 36a for tightly embracing the shank 12a and is of substantially cylindrical configuration before being deformed upon assembly in the unit 28. In assembly the stamping 34 retains the gasket 36 and is pressed downwardly by the linkage member 24 to deform the gasket 36 about the intermediate stamping 32. The deformation causes tighter sealing contact between the gasket 36 and the stud shank 12a and causes pressure to bear against the stampings 32 and 30.

The aforementioned pressure upon the stampings 30 and 32 effectively seals their contact with one another and the housing 10. When the stud is initially tilted by forces on the linkage member 24, the stampings 32, 34 and the gasket 36 move with the stud 12 as a unit, the member 32 sliding about the lowermost stamping 30. When the stud has been sufficiently tilted, the shank 12a comes in contact with the inturned flange portion 30a of the stamping 30 and causes movement of the stamping 30 about the rounded portion 10a of the housing 10. As illustrated in Fig. 3, the stud has been completely tilted to the right, the stamping 30 being telescoped about the housing 10 to the far right and the stamping 32 being telescoped about the stamping 30 to the far right. This point of complete tilting movement is reached when the flange 30a of the stamping 30 abuts the shoulder of the housing 10 defining the opening 10b. The shoulder of the housing is the innermost portion 10h of the rounded portion 10a.

It is obvious from the aforedescribed assembly of the elements, that the seal unit 28 seals the stud opening of the joint at the shank of the housing and at the outer periphery of the housing opening, while the stud element is in either normal or tilted position. The sealing occurs about the shank of the stud by sealing contact of the rubber-like gasket member and at the opening of the housing by pressure contact of a plurality of telescoping sheet metal stampings.

It will be equally obvious that similar or identical seal units may be employed to seal the stud openings of a stud joint assembly which utilizes a plurality of studs. The sealing is effective to prevent the entry of dust or fluid to the joint housing about the stud elements.

It will be understood that modifications and variations may be effected without departing from the scope of the novel concepts of the present invention.

I claim as my invention:

1. A joint comprising a housing provided with means for connection to a tie rod or the like, a stud element projecting from one end of said housing through an opening in the wall thereof, bearing means associated with the internally disposed end of said stud element and said housing, a plurality of annular segmental spherical cover members embracing the projecting end portion of said stud element in telescoping relation adjacent said housing, the innermost of said cover members being slidable on said housing and having a downwardly formed inner rim portion loosely surrounding the stud, said downwardly deformed rim being engageable with the inner edge of said opening in said housing to limit movement of the innermost cover member on the housing to prevent unsealing movement of said innermost cover member therefrom, and means for retaining said cover members in snug telescoped relation with each other and with said housing.

2. A tie rod joint comprising an open ended housing provided with means for connection to a tie rod or the like, a stud element freely projecting from said housing, bearing means within said housing supporting said stud element, a plurality of annular segmental spherical cover members embracing said stud element in telescoping relation, a deformable resilient seal member embracing said stud element adjacent said cover members, a cap embracing said stud element adjacent said seal member, a downwardly turned rim about the inner periphery of the inner cover member loosely embracing said stud element and adapted to engage the stud opening of said housing to provide a stop for preventing unsealing of the cover, an axially outwardly formed rim about the inner periphery of the adjacent cover member snugly fitting said stud element, and a downturned rim about the outer periphery of said cap, said downturned rim embracing and compressing the outer periphery of said resilient member so as to deform said resilient member inwardly and downwardly upon the application of pressure to the top of said cap while restraining radial deformation, thereby sealing said stud element and said plastic member and creating sealing pressure between said covers and said housing.

3. A tie rod joint comprising a housing having an open end defined by a segmental spherical portion of said housing and being provided with means for connection to a tie rod or the like, a stud element freely projecting from said open end, bearing means associated with said stud element and said housing, a first annular cover member freely embracing said stud element, a downwardly turned rim on the inner periphery of said cover member for contacting the inner edge of the open end of the housing to limit telescoping movement of said cover member and tilting movement of said stud element, a second annular cover member snugly embracing said stud element and contacting said first cover member in a telescoping manner, a deformable resilient annular member snugly embracing said stud element adjacent said second cover member, and an annular cap snugly embracing said stud element adjacent said resilient member, said cap having a cupped rim embracing and compressing the outer periphery of said resilient member so as to deform said plastic member inwardly and downwardly substantially about said second annular cover member when pressure is applied to said cap to thereby maintain a heavy controlled pressure against said cover members to maintain them in sealing condition.

4. In a universal joint seal comprising a plurality of segmental spherical annular members in superimposed position about a stud projecting from said joint, the innermost of said members having engagement structure to engage said joint and prevent unsealing thereof, an annular deformable resilient member providing a seal between said members and said stud, and an annular metal cap member superimposed on said deformable member and said segmental spherical members for retaining said members in sealed relation, said annular metal cap member having a downturned rim terminating substantially above said segmental spherical annular members and cooperating with the outer peripheral edge of the deformable member to compress the deformable member and confine its flow under compression to movement downwardly and outwardly only between the downturned rim and the adjacent segmental spherical annular member to urge the outermost of said segmental spherical members into sealing engagement with the remaining segmental spherical members.

5. A seal for an oscillatory joint of the type having a housing with a segmental spherically shaped open end enclosing a freely movable stud element including a bearing face complementally shaped to the inner surface of the segmental spherical end of said housing and a shank extending through the opening in said housing, a plurality of telescoping relatively movable annular elements complementally shaped to each other and to the exterior segmental spherical end of said housing, the inner of said annular elements loosely embracing the shank of said stud element and the outer of said annular elements snugly embracing the shank of said stud element, a readily deformable resilient washer element positioned over said outer annular element snugly fitting against said stud shank and confined against radially outward and upward expansion by an annular cap member having a downwardly extending marginal flange terminating substantially above said relatively movable annular elements and coacting with the outer periphery of the washer element, means acting downwardly upon said annular cap to compress and thereby urge said washer element inwardly against said stud shank and downwardly into snug compressive cooperation with said outer relatively movable annular member.

References Cited in the file of this patent

UNITED STATES PATENTS

| Number | Name | Date |
| --- | --- | --- |
| 1,051,025 | Spicer | Jan. 21, 1913 |
| 1,223,524 | Rosenberg | Apr. 24, 1917 |
| 2,083,718 | Kull et al. | June 15, 1937 |
| 2,110,561 | Stephens | Mar. 8, 1938 |
| 2,115,087 | Schaefer | Apr. 26, 1938 |

FOREIGN PATENTS

| Number | Country | Date |
| --- | --- | --- |
| 690,570 | Germany | of 1940 |
| 690,752 | Germany | of 1940 |
| 714,170 | Germany | of 1941 |